United States Patent
Birks

(10) Patent No.: US 6,192,074 B1
(45) Date of Patent: *Feb. 20, 2001

(54) FIXED FREQUENCY SOURCE TIMING PROCESSOR METHOD AND APPARATUS

(75) Inventor: David Andrew Birks, Jackson, NJ (US)

(73) Assignee: Sarnoff Corporation, Princeton, NJ (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/856,454

(22) Filed: May 14, 1997

(51) Int. Cl.⁷ ........................................................ H04N 7/12
(52) U.S. Cl. .............................................. 375/240; 380/15
(58) Field of Search ................................ 348/384, 845.3, 348/541, 537, 518, 464; 345/213

(56) References Cited

U.S. PATENT DOCUMENTS

| 5,113,440 | * | 5/1992 | Harney et al. | 380/15 |
| 5,473,385 | * | 12/1995 | Leske | 348/845.3 |
| 5,771,075 | * | 6/1998 | Rim et al. | 348/512 |

* cited by examiner

Primary Examiner—Christopher S Kelley
Assistant Examiner—Shawn S. An
(74) Attorney, Agent, or Firm—William J. Burke

(57) ABSTRACT

The decoder method and apparatus receives an information stream comprising timing information and respective payload information. A substantially fixed frequency source is used to generate local timing information, which is used to decode the payload information. A difference signal representing the timing difference between the local timing reference and the received timing information is calculated and used to adjust the decoded payload information signal.

8 Claims, 1 Drawing Sheet

FIXED FREQUENCY SOURCE TIMING PROCESSOR METHOD AND APPARATUS

The invention relates to communication systems in general, and more particularly, the invention relates to a method and apparatus for utilizing a substantially fixed frequency oscillator within a timing processor.

BACKGROUND OF THE DISCLOSURE

Synchronization of a decoding and presentation process for received bitstreams is a particularly important aspect of real-time digital data delivery systems. For example, the Moving Pictures Experts Group (MPEG) has promulgated several standards relating to digital data delivery systems. The first, known as MPEG-1 refers to ISO/IEC standards 11172-1 (Systems), 11172-2 (Video), 11172-3 (Audio), 11172-4 (Compliance Testing), and 11172-6 (Technical Report). The second, known as MPEG-2, refers to ISO/IEC standards 13818-1 (Systems), 13818-2 (Video), 13818-3 (Audio), 13818-4 (Compliance).

The MPEG standards address the timing and synchronization issues for decoders of MPEG data streams (e.g., video, audio, data, and the like) as follows. A sample of a 27 MHz clock is transmitted in a program clock reference (PCR) field of a transport stream packet. The PCR indicates a time when the transport decoder is expected to have completed reading the PCR field. The phase of the local clock running at the decoder is compared to the PCR value in the bit stream at the instant at which it is obtained to determine whether the decoding process is synchronized.

In general, the PCR from the transport bit stream does not directly change the phase of the system clock of the decoder, but only serves as an input to adjust the clock rate of a Voltage Controlled Crystal Oscillator (VCXO). This adjustment is accomplished by comparing the PCR sample to the output frequency of the VCXO and responsively adjusting the VCXO until the two frequencies match. The system clock of the decoder is then derived from the VCXO. Thus, the system clock of the decoder is adjusted and locked to the 27 MHz clock of the encoder or transmitter via the transmitter clock sample included in the PCR.

A disadvantage of the prior art decoder arrangement is the relatively high cost of the VCXO. Therefore, a need exists in the art for a method and apparatus which is able to perform timing functions in a data delivery system using an inexpensive oscillator, e.g., a substantially fixed frequency oscillator.

SUMMARY OF THE INVENTION

Part of the invention resides in the recognition by the inventor that, in some real time digital data delivery systems, there are portions of the data which may be modified without reducing the efficacy of the system.

The timing method and apparatus receives an information stream comprising timing information and respective payload information. A substantially fixed clock source is used to generate local timing information, which is used to decode the payload information. A difference signal representing the timing difference between the local timing reference and the received timing information is calculated and used to adjust the decoded payload information signal.

In the case of a decoded payload information signal having critical and non-critical portions, the adjustment may be made during non-critical portions of the signal such that the critical portions are suitably time aligned.

In the case of an MPEG encoded video information signal, a decoder may use the fixed frequency oscillator to decode an MPEG-compliant bitstream. The presentation timing of the video may be adjusted to compensate for differences between the local clock and an encoder clock. The adjustment may be made by selectively increasing or decreasing the length of one or more horizontal display lines during a vertical blanking interval.

BRIEF DESCRIPTION OF THE DRAWING

The teachings of the present invention can be readily understood by considering the following detailed description in conjunction with the accompanying drawing, in which.

DETAILED DESCRIPTION

Figure 1:
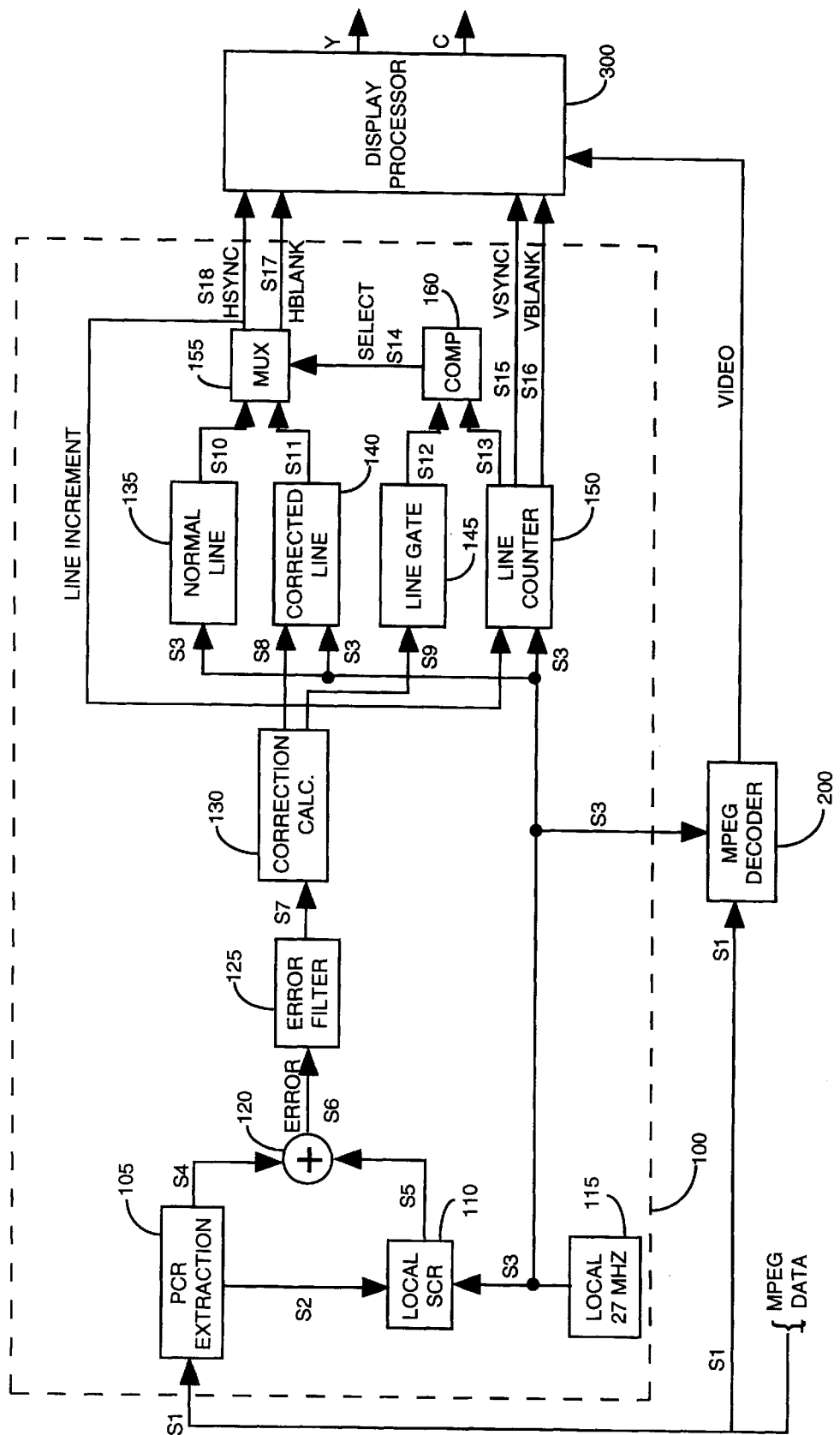
FIG. 1 shows a block diagram of an MPEG video processing system including a timing processor according to the invention.

The invention will be described within the context of a timing processor for use in an MPEG-compliant video processing system. However, it must be noted that the embodiment of the invention described herein may be modified for use in other data systems where, e.g., timing information may be manipulated on a periodic basis (frame by frame, segment by segment, and the like) to correct timing errors which may have been introduced into the signal of interest (e.g., video, audio, and the like). A timing processor according to the invention compares a fixed local clock reference to a timing reference associated with a data stream to produce indicium of timing error. The fixed local clock reference is used to recover data from the data stream and the indicium of timing error is used to adjust the recovered data. The adjustment is made periodically during a portion of the data stream which does not adversely affect the intended use of the data carried in the data stream (e.g., non-viewable video portions, non-informative portions, blank portions, synchronizing portions, and the like). In this manner, any errors introduced by the fixed oscillator (e.g., drift or noise errors) into the recovered data will be corrected without reducing the efficacy of the data stream.

FIG. 1 shows a block diagram of an MPEG video processing system including a timing processor 100 according to the invention. The timing processor 100 is part of a video processing system including a video decoder 200 and a display processor 300. Video decoder 200 receives an MPEG stream S1, decodes the stream to produce a video signal VIDEO that is coupled to the display processor 300. Timing processor 100 receives the MPEG stream S1 and produces various synchronizing signals (e.g., horizontal sync, horizontal blanking, vertical sync and vertical blanking) that is coupled to the display processor 300. The display processor 300 processes the signals received from the timing processor 100 and the video decoder 200 to produce a luminance signal Y and a chrominance signal C for display by a display device (not shown). The luminance Y and chrominance C signals may be encoded as, e.g., NTSC, PAL or SECAM formatted signals.

The timing processor 100 includes a local 27 MHz clock source 115, illustratively a fixed frequency crystal oscillator. This clock source is used by the entire decoder, even though the clock may not be as accurate as the MPEG specifications require (i.e., 27 MHz±20 parts per million (ppm)). For example, a typical crystal oscillator is capable of providing 27 MHz±100 ppm. The inventor recognized that portions of an MPEG decoder will function normally even with such a local 27 MHz clock; however, the output video frames produced by the decoder may require correction prior to display to ensure accurate depiction of the video images.

A PCR extraction unit 105 receives an MPEG data stream S1 and extracts a PCR timing signal S4 from that stream. It should be noted that the PCR is a number that increments at a 27 MHz rate according to a 27 MHz clock used to encode the MPEG data stream S1 at a transmitter. The PCR is periodically present in data stream S1 and the presence of the PCR is indicated by a signal S2.

A local SCR signal S5 is generated by a local source clock reference (SCR) generator 110 which receives a 27 Mhz clock signal S3 from a local 27 MHz source 115, a fixed frequency crystal oscillator. The SCR generator 110 produces a number which is incremented at a 27 MHz rate according to the local 27 MHz clock signal 83. In response to the PCR present signal S2, the SCR generator 110 outputs the instantaneous SCR count as local SCR signal S5.

The extracted PCR signal S4 is subtracted from the local SCR signal S5 using a subtractor 120 to produce an error signal S6. Error signal S6 is the difference between extracted PCR signal S4 and locally generated SCR signal S5 and provides an indication of the error between the 27 MHz clock used in the transmitter encoder and the locally generated 27 MHz clock 115., e.g., a number of 27 MHz cycles difference.

An optional filter 125, illustratively a recursive numerical filter, may be used to provide a filtering or smoothing function to the error signal S6 to produce filtered error signal S7. Error signal S6 may require filtering to remove large values caused by discontinuities of the incoming PCR/SCR. These discontinuities may be caused by, e.g., MPEG stream switching or splicing at the encoder end or during transport, or local program changes such as channel selection changes.

Normal line counter 135 is a counter that is slaved to local 27 MHz signal S3. Normal line counter produces an output signal S10 indicative of the duration of a normal horizontal line, i.e., a normal horizontal sync pulse indicator. In an NTSC system, the frequency of the horizontal sync pulse is nominally 15,750 Hz. As such, a horizontal sync pulse is produced every 1,714.286 cycles of the 27 MHz clock signal S3. The normal horizontal sync pulse S10 is coupled to a multiplexer 155.

Multiplexer 155 receives the normal horizontal sync pulse S10 from the normal line counter 135 and produces a horizontal sync pulse HSYNC and a horizontal blanking pulse HBLANK that are coupled to a display processor (not shown). The horizontal sync pulse HSYNC is also coupled to a line counter 150 as the signal LINE INCREMENT. Line counter 150 responsively produces a vertical sync pulse VSYNC and a vertical blanking pulse VBLANK In an NTSC system, the frequency of the vertical sync pulse is nominally 60 Hz system, the frequency of the horizontal sync pulse is nominally 15,750 Hz. As such, a vertical sync pulse is produced every 45,000 cycles of the 27 MHz clock signal S3. Line counter 150 also produces a line counter signal S13 which indicates the present line count. The line counter signal S13 is reset for each video field (i.e., with each vertical sync pulse).

The timing processor 100 of FIG. 1 corrects timing errors by increasing or decreasing the duration of horizontal lines occurring during a vertical blanking interval. In the case of a fixed crystal having a tolerance of ±100 ppm, the worst case timing error would be ±120 ppm (±20 ppm of transmitter clock error added to crystal error of ±100 ppm). In this worst case scenario; the processor 100 must adjust the vertical blanking period by a maximum of ninety 27 MHz clock cycles in each field. Such an adjustment would require that the duration of each horizontal line in a vertical blanking interval be increased by approximately two 27 MHz clock periods. This calculation is made using the time required for a vertical blanking interval, the number of lines in a vertical interval and the total amount of time to be added or subtracted per frame or field. These numbers vary depending upon the type of display system (e.g., NTSC, PAL or SECAM).

The above calculation is made within a correction calculator unit 130, which receives error signal S6 (or filtered error signal S7) and processes the error signal to produce a line correction signal S8 and an associated line gate signal S9. Line correction signal S8 is a counter value representing a horizontal line having an increased or decreased duration (when compared to the value of the normal line counter). In the above worst case scenario (i.e., timing error of ±120 ppm), the value of line correction signal S8 is the value of the normal line counter value, plus two. Line gate signal S9 indicates the number of lines in the vertical blanking interval that must be subjected to correction (i.e., increased or decreased duration). In the above worst case scenario (i.e., timing error of +120 ppm), substantially all of the lines within the vertical blanking period require correction.

A corrected line counter 140 receives the line correction signal S8 and produces an output signal S11 indicative of the duration of a corrected horizontal line, i.e., a corrected horizontal sync pulse. The corrected horizontal sync pulse S10 is coupled to multiplexer 155.

A line gate unit 145 receives the line gate signal S9 and produces an output signal S12 that represents the line count at which the corrected horizontal line should be used to produce the horizontal sync pulse HSYNC.

A comparator 160 compares the output signal S12 of line gate unit 145 and the present line count signal S13 from line counter 150. When the line count signal S13 exceeds the line gate output signal S12 a comparator output signal S14 (SELECT) causes the multiplexer 155 to select the output signal S11 of corrected line counter 140. Thus, the corrected (i.e., longer or shorter) line count signal is used to produce the horizontal sync pulse HSYNC and horizontal blanking pulse HBLANK.

Display processor 300 receives the various synchronizing signals from timing processor 100 and the decoded video signal from video decoder 200. The decoded video signal represents a plurality of video frames or fields and each frame or field is represented by a plurality of lines. The display processor 300 associates each of the lines of video with respective timing information (i.e., HSYNC) to produce the output luminance Y and chrominance C signals for display by a display device (not shown). The luminance Y and chrominance C signals may be encoded as, e.g., NTSC, PAL or SECAM formatted signals.

The above-described embodiment of the invention operates by sensing the error between the local and extracted timing signals and responsively adjusting the horizontal line length of the video signal during vertical blanking. This provides an alternate value for line length and a range of lines for which this alternate value must be applied. Thus, by making a horizontal line longer, more time is consumed in producing that line and, by keeping track of the excess time consumed, the local clock is, in essence, locked to the remote clock. In this manner an inexpensive fixed frequency local oscillator is used and the presentation time of the video signal is accurately produced. It should be noted that the field or frame time correction can be easily achieved by modifying the various counters to adjust the horizontal line time during vertical blanking. This adjustment is entirely unnoticed to a viewer.

Although various embodiments which incorporate the teachings of the present invention have been shown and described in detail herein, those skilled in the art can readily devise many other varied embodiments that still incorporate these teachings.

What is claimed is:

1. A method of processing an information stream comprising remote timing information and respective payload information including video information comprising viewable and non-viewable horizontal video lines, said method comprising the steps of:

generating local timing information utilizing a fixed frequency source;

calculating a difference between said remote timing information and said local timing information;

decoding said payload information using said local timing information signal to produce decoded payload information; and correction timing errors by selectively increasing or decreasing the duration of non-viewable horizontal video lines.

2. The method of claim 1 wherein:

said non-viewable horizontal video lines comprise horizontal video lines occurring during a vertical blanking interval said selective increase or decrease in duration of said horizontal video lines causing a corresponding increase or decrease in said vertical blanking interval.

3. The method of claim 1 wherein said calculating step further comprises the step of filtering said difference.

4. The method of claim 1, wherein said calculation is made using the time required for a vertical blanking interval the number of horizontal lines occurring within the vertical blanking interval, and the total amount of time to be added or subtracted from a frame or field to correct a timing error.

5. Apparatus for processing an information stream comprising remote timing information and respective payload information comprising video information comprising viewable and non-viewable horizontal video lines, said apparatus comprising:

a source of a fixed frequency signal, a subtractor coupled to said fixed frequency source, and responsive to said fixed frequency signal and said remote timing information, for producing a difference signal;

a correction calculator coupled to said subtractor, and responsive to said difference signal, for producing at least horizontal synchronizing signals compatible with a payload information decoder, said correction calculator correcting timing errors by selectively increasing or decreasing the duration of horizontal synchronizing signals associated with non-viewable horizontal video lines.

6. The apparatus of claim 5 wherein said subtractor further comprises a an output filter for filtering said difference signal.

7. The apparatus of claim 5 wherein:

said horizontal lines occurring during a vertical blanking interval, said selective increase or decrease in duration of said horizontal lines causing a corresponding increase or decrease in said vertical blanking interval.

8. The apparatus of claim 5 wherein:

said calculation is made using the time required for a vertical blanking interval, the number of horizontal lines occurring within the vertical blanking interval, and the total amount of time to be added or subtracted from a frame or field.

* * * * *